United States Patent [19]

Zeller et al.

[11] Patent Number: 4,548,454
[45] Date of Patent: Oct. 22, 1985

[54] ELECTRICAL CONTACT FOR A VEHICLE STEERING DEVICE

[75] Inventors: Gregor Zeller; Helmut Bonn, both of Aschaffenburg, Fed. Rep. of Germany

[73] Assignee: Petri A.G., Fed. Rep. of Germany

[21] Appl. No.: 450,297

[22] Filed: Dec. 16, 1982

[30] Foreign Application Priority Data

Dec. 19, 1981 [DE] Fed. Rep. of Germany ....... 3150427

[51] Int. Cl.⁴ .......................................... H01R 39/00
[52] U.S. Cl. .................... 339/3 S; 339/5 M; 339/6 R; 339/8 PB; 339/218 M
[58] Field of Search ............. 339/3 S, 3 R, 5 R, 5 M, 339/5 P, 6 R, 8 R, 8 PB, 5 RL, 5 S, 6 RL, 8 RL, 8 PS, 218 R, 218 M

[56] References Cited

U.S. PATENT DOCUMENTS

| 3,501,204 | 3/1970 | Schreffler | 339/8 PB X |
| 3,876,272 | 4/1975 | Tsutsumi et al. | 339/3 S |
| 3,940,200 | 2/1976 | Schreffler | 339/5 R X |
| 4,006,954 | 2/1977 | Ikawa et al. | 339/8 R |
| 4,462,648 | 7/1984 | Föhl | 339/3 S |

FOREIGN PATENT DOCUMENTS 961224 11/1949 France .................. 339/5 P

Primary Examiner—Gil Weidenfeld
Assistant Examiner—Steven C. Bishop
Attorney, Agent, or Firm—Robert J. Koch

[57] ABSTRACT

Disclosed is a contact means for the transmission of signal or ignition current between the stationarily mounted steering column and the steering wheel rotatable with respect to the steering column. A contact track is fastened to the steering column and a counter contact track is fastened to the steering wheel. The contact track and coinciding counter contact track hold a contact body comprising at least one, preferably three roller bodies by means of a ball cage ring at a uniform angular distance of 120° in the ball races. One of the contact tracks is elastically supported.

6 Claims, 4 Drawing Figures

ELECTRICAL CONTACT FOR A VEHICLE STEERING DEVICE

BACKGROUND OF THE INVENTION

1. Field of the Invention

The invention concerns contact means for the transmission of a signal or ignition current from a stationarily mounted steering column to the steering wheel rotatable with respect to the steering column in a vehicle such as an automobile. A contact is mounted on the steering column and a counter contact is mounted on the steering wheel to form the track for the contact of a contact body joined with the contact.

2. Background of the Prior Art

Known contact means of this type consist, for example, of conventional slip ring contacts used in the contruction of automotive vehicles. These contacts serve to bridge any gap or interruption of the signal circuit and of the ignition circuit when protective gas bag devices are deployed, for example, between the stationarily mounted steering shaft casing and the steering shaft or steering wheel hub. The typical hub is rotatable from a center position up to four revolutions in both directions of rotation. The disadvantages of slip ring contacts, especially when used in the aforementioned application consist in particular of the fact that the generation of grinding noises noticeable in the passenger compartment cannot be excluded. This is especially true if, as for example, in the ignition circuit of a gas bag impact protection system, the contact body must be held against the slip ring with a high contact pressure, in order to prevent an interruption of the connection in case of an accident.

SUMMARY OF THE INVENTION

It is an object of the present invention to provide contact means with a reduced generation of noise even in the case of high contact pressure. The invention comprises the fact that a contact is formed by a contact path of a conducting material and coinciding with the countercontact path and that the contact body comprising a rolling body is guided in roller tracks formed from the contact and counter contact paths approximately to the extent of one half in each.

The invention provides a contact device which eliminates the sliding friction usually present in the known slip ring contacts and wherein the conducting contact between the contact and the counter contact is effected by means of a moving roller body. Thus, no grinding noise is generated even under high contact pressures. As a further advantage of the contact means according to the invention, substantially expanded possible applications result. At least one of the two contact or counter contact paths is held elastically against the roller bodies. For this purpose, separate springs may be applied to the contact track, for example, coil springs. The choice of springs with respect to numbers and spring constants afford a wide range of the contact pressure adaptable to the prevailing conditions. In an alternate embodiment, the contact track may be equipped with spring tongues resting with their free ends against the casing. In this fashion, an elastic pressure of the contact and counter contact tracks against the roller bodies may be effected. In yet a further embodiment, the spring tongues are conveniently stamped in a single piece from the contact or counter contact tracks themselves or form the bearing shells supporting the tracks. This embodiment renders possible an extremely simple manufacture of contact means satisfying the requirements of a wide range of applications.

The contact bodies appropriately comprise one or more balls, in which case the roller tracks are constituted by ball races. For special applications different types of roller bodies may be provided with a suitable adaptation of the tracks.

Generally, a single roller body is sufficient to obtain an adequate current transfer cross section. Three or more roller bodies, however, are most conveniently used. The three balls are held in a cage extending in a plane between the contact and counter contact tracks at a uniform distance. This arrangement assures that the two contact tracks are held spaced apart at a uniform distance from each other with the roller bodies acting as a three-point support or in the case of the use of a plurality of roller bodies as a uniform multiple point support.

BRIEF DESCRIPTION OF THE DRAWING

The invention will become more apparent from the examples shown in the drawing. In the drawing.

DETAILED DESCRIPTION OF THE PREFERRED EMBODIMENTS

Figure 3:
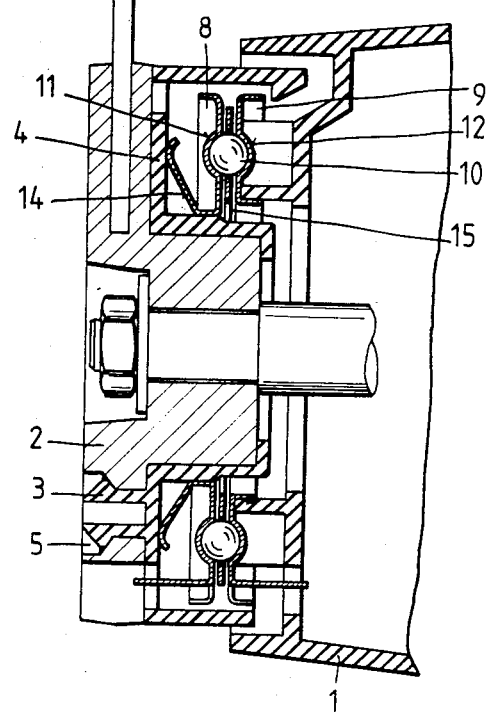
FIG. 3 is a similar cross sectional view through another form of a contact device in the assembled state.

The contact device shown in the drawing is constructed for use in an automobile for the transmission of the signal current between the steering column and the steering wheel hub which is rotatable with respect to the steering column. As shown in FIG. 3, the steering shaft 1 comprises an insulating material and the metal steering wheel hub 2 is equipped with an insulating ring with a holding cam 3 which is clipped into an appropriately stepped bore hole 5. The holding cam fastens it to the steering wheel hub.

Figure 2:
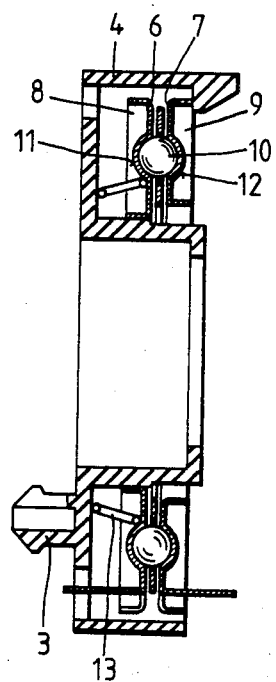
FIG. 2 illustrates a cross sectional view through the device of FIG. 1.

The contact and the counter contact are shown in FIG. 2 comprising the contact itself (not numbered) and counter contact tracks 6, 7 extending in a parallel manner at a slight distance from each other. The tracks are molded into a bearing shell 8, 9. In the present application concerning signal-current transmission in steering wheels, the bearing shell 8 arranged in the steering wheel hub constitutes the "upper" shell and the bearing shell 9 arranged in the steering shaft casing constitutes the "lower" bearing shell. The contact body comprises balls 10 which are guided to approximately one half of their circumference in the ball races 11, 12 of the contact tracks.

Figure 4:
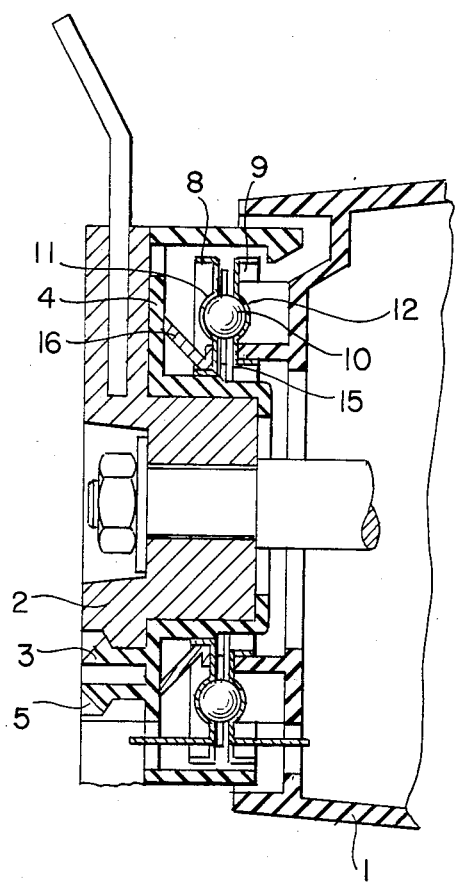
FIG. 4 is a cross-sectional view similar to FIGS. 2 and 3 through yet another form of a contact device in the assembled state.

The upper bearing shell 8 is biased against the balls 10. In the embodiment shown in FIG. 2, a coil spring 13 is provided as the biasing means independently of the bearing shell. In the embodiment shown in FIG. 3, a spring tongue 14 stamped from the bearing shell itself is provided as the biasing means present. In a further embodiment, shown in FIG. 4, the upper bearing shell 8 is held elastically by a plurality of spring tongues 16 injection molded onto the insulating ring 4.

Figure 1:
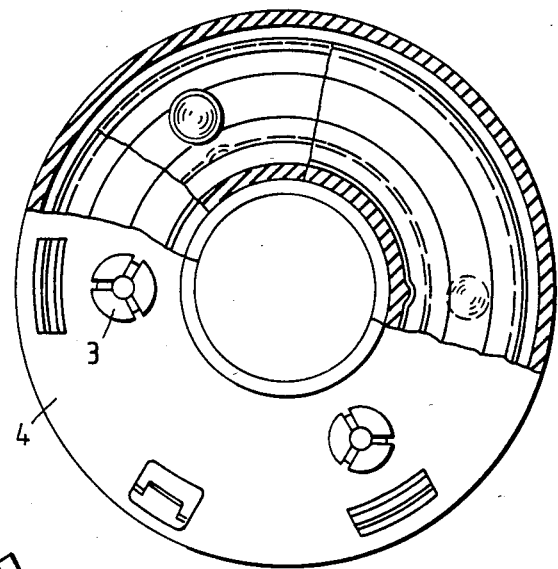
FIG. 1 shows a contact device in partial top sectional view.

Electrical requirements are satisfied in most instances by the arrangement of a single contact ball. Notwithstanding these minimum requirements, at least three balls are advantageously used. As shown in FIG. 1, the three balls are bearingly supported from one another at an angular distance of 120°. The balls are held in their angular position as shown in FIG. 3 by means of a ball cage ring 15 extending in the plane between the bearing shells 8, 9.

The above description describes a preferred embodiment of the invention. It is to be understood, however, that the invention is not limited to any single embodiment or feature, but should be construed to cover all modifications and alternative embodiments falling within the scope of the invention as defined by the claims which follow.

What is claimed is:

1. An electrical contact for a vehicle steering device comprising:
   a steering column mounted in a stationary position to a vehicle chassis;
   a steering wheel rotatably mounted to said steering column;
   means for making an electrical connection between said steering column and said steering wheel, said means including
   a first contact track disposed in said steering column and a second contact track disposed in said steering wheel, said contact tracks forming roller body races;
   at least one roller body disposed in said roller body races; and
   a plurality of spring tongues for biasing said first and second contact track against said at least one roller body;
   wherein said at least one roller body is guided approximately one half by each of said pair of contact tracks.

2. The electrical contact for a vehicle steering device of claim 1, wherein said spring tongues are stamped out of said first contact track and biased against said steering column.

3. The electrical contact for a vehicle steering device of claim 1, wherein said spring tongues are stamped out of said second contact track and biased against said steering wheel.

4. The electrical contact for a vehicle steering device of claim 1, wherein said spring tongues are injection molded into an insulation housing on said steering column.

5. The electrical contact for a vehicle steering device of claim 1, wherein said at least one roller body comprises three roller bodies uniformly spaced from one another about said roller body races.

6. The electrical contact for a vehicle steering device of claim 1, wherein said roller bodies are secured equidistant from one another by a guide means extending in the plane between said first and second contact tracks.

* * * * *